Nov. 3, 1942.                K. BRENKERT                 2,301,011
                      ELECTRODE FEEDING MECHANISM
                      Filed Feb. 15, 1941     3 Sheets-Sheet 1

INVENTOR.
Karl Brenkert
BY Samuel Weisman
ATTORNEY.

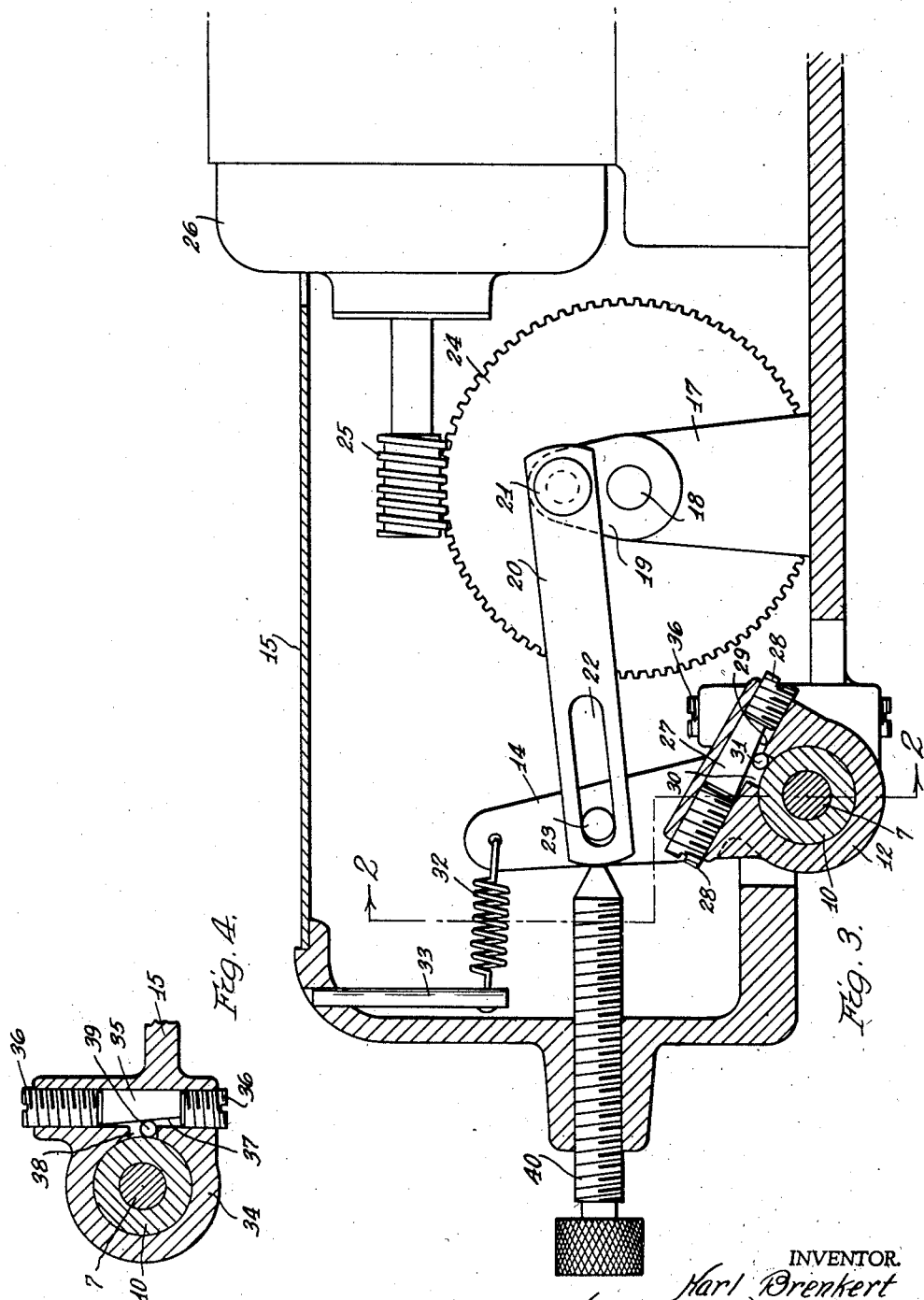

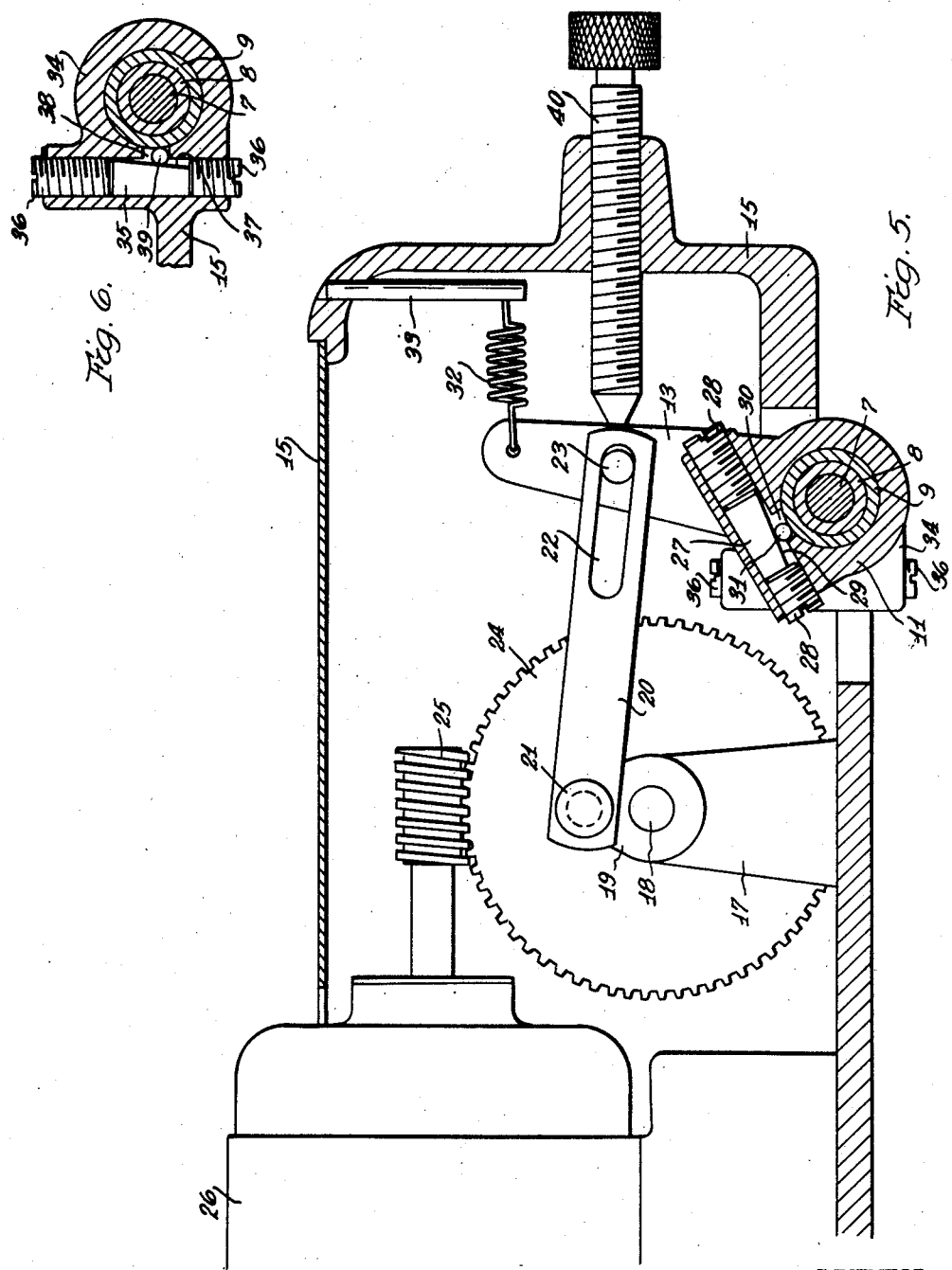

Patented Nov. 3, 1942

2,301,011

UNITED STATES PATENT OFFICE

2,301,011

ELECTRODE FEEDING MECHANISM

Karl Brenkert, Detroit, Mich., assignor to Brenkert Light Projection Company, Detroit, Mich., a corporation of Michigan Application February 15, 1941, Serial No. 379,087

12 Claims. (Cl. 314—53)

In the operation of arc lamps, particularly in the projection of motion pictures, it is common practice to vary the arc forming current in order to regulate the intensity of the projected light. The rate of electrode consumption varies with the arc forming current, and it therefore becomes necessary to regulate the electrode feeding mechanism when the arc current is altered.

This is usually done by changing the speed of the motor that operates the electrode feed screws. Where a cerium cored electrode is used, the consumption rates of the positive and negative electrodes do not vary in the same ratio to the speed of the feed motor, and consequently a compensating adjustment must be made on the feed mechanism of one of the electrodes.

This method of control, although widely used, has met with dissatisfaction on the part of the projectionists. The separate adjustment of one of the electrode feeds after regulation of the feed motor is confusing and is awkward from the mechanical point of view. Moreover, this method of adjusting first the motor speed and then the compensating device introduces an erratic action which is very objectionable.

The principal object of this invention is to provide an electrode feed mechanism that is free of these objections and that requires no adjustment of the feed motor. More specifically, the feed motor in this invention drives separate and independently adjustable units for the respective electrodes. Each such unit comprises a feed screw or shaft for propelling the electrode holders, in conjunction with an adjustable drive member between the screw and the motor. The drive member is in the nature of an intermittent or escapement movement with means for adjusting the effective stroke thereof, whereby the effect of the motor on each feed screw may be independently adjusted. The two adjusting devices are in close proximity to each other on a convenient part of the lamp housing and are identical in action and appearance. Thus, both feed units are adjusted in like manner, and this mode of operation is simpler to understand and to manipulate than the variable speed motor and compensating device for one electrode, described above. Also, the invention enables the use of a non-variable speed motor, with resulting steadier motor speed.

The invention is fully disclosed by way of example in the following description and in the accompanying drawings in which:

Figure 3 is the section on the line 3—3 of Figure 2;

Figure 4 is the section on the line 4—4 of Figure 2;

Figure 5 is the section on the line 5—5 of Figure 2, and

Figure 6 is the section on the line 6—6 of Figure 2.

Reference to these views will now be made by use of like characters which are employed to designate corresponding parts throughout.

Figure 1:
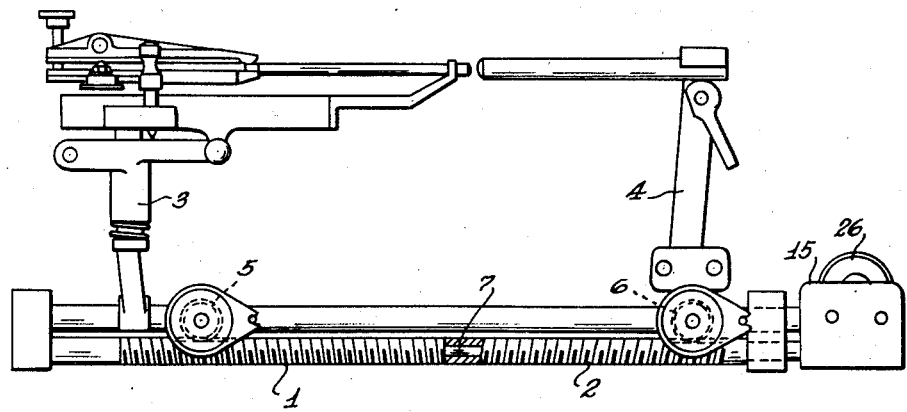
Figure 1 is an elevation showing the feed screws and the electrode holders propelled thereby.

Figure 1 illustrates the feed screws or screw shafts 1 and 2 which respectively propel the electrode holders 3 and 4 through pinions 5 and 6. Except for the construction of the shafts, this device is similar to that shown in my United States patent, No. 2,168,697, of August 8, 1939, it being understood that the mechanism for driving the shafts is entirely different and constitutes the subject matter of this invention.

Figure 2:
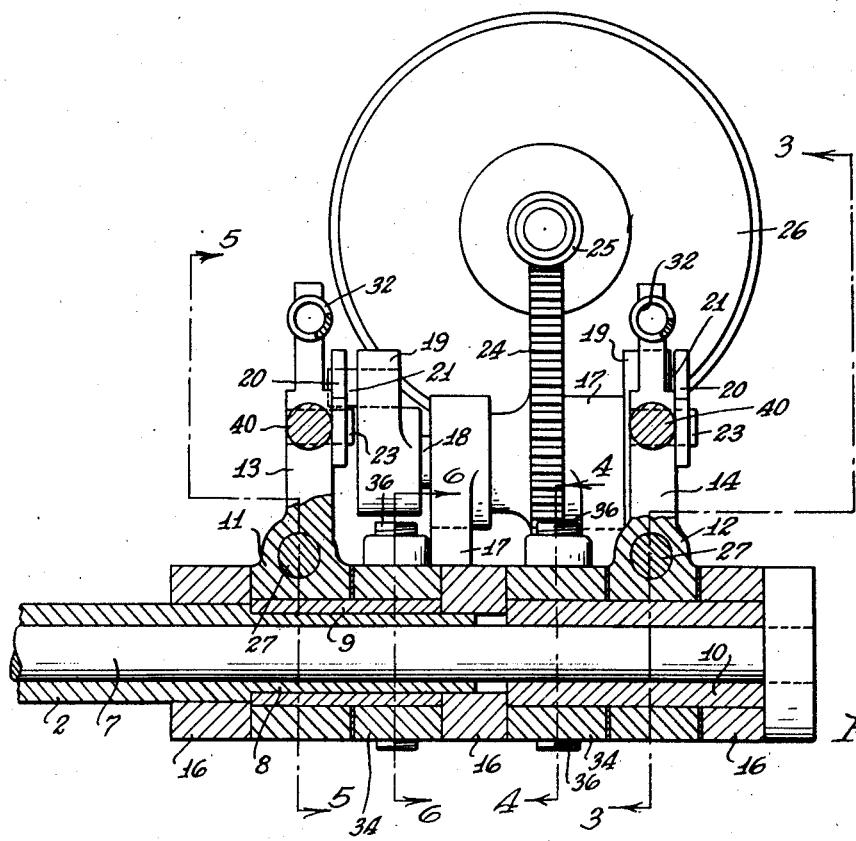
Figure 2 is a longitudinal section on the line 2—2 of Figure 3, at one end of the screw shafts and illustrating the driving mechanism applied to the shafts.

The shaft 2 is hollow and receives a spindle extension 7 of the shaft 1, as shown more clearly in Figure 2. The feed or screw portions of the shafts are oppositely threaded and preferably of equal outside diameter for moving the electrode holders 3 and 4 simultaneously in opposite directions, as well known in the art and as illustrated in Figure 1.

The mechanism shown in Figure 2 operates preferably on the forward ends of the shafts extended through the front wall of the lamp housing. The spindle 7 is extended forwardly beyond the reduced forward end 8 of the outer shaft 2. This reduced end carries a hardened sleeve 9, and the exposed portion of the spindle 7 also carries a hardened sleeve 10 having the same outside diameter as sleeve 9. The sleeves are secured on their respective shafts by any suitable means such as a drive fit.

Bosses 11 and 12 with extended arms 13 and 14 of substantially identical construction are mounted respectively on the sleeves 9 and 10. The mechanism is enclosed for the most part in a housing 15 formed with spaced bearings supporting the rotatable parts 2, 9 and 10 as shown in Figure 2.

On the bottom of the housing 15 are mounted a pair of upright bearings 17 supporting a shaft 18 parallel with the spindle 7. The shaft 18 carries a pair of cranks 19 positioned to be linked to the arms 13 and 14. A link 20 is pivotly attached to an eccentric pin 21 on each crank and is slotted longitudinally at 22 to receive a pin 23 on the corresponding arm 13 or 14. The shaft 18 also carries a worm gear 24 meshing with a worm 25 driven at constant speed by an electric motor 26. It is now evident that, on operation of the motor, the bosses 11 and 12 are oscillated on the sleeves 9 and 10 respectively.

Each of the bosses embodies a one-way driving mechanism acting on the corresponding sleeve. Since both mechanisms are alike, only one need be described in detail. It consists of a wedge or tapered pin 27 held in the boss by a pair of screw plugs 28 and lying perpendicular to the sleeve. The inclined side 29 of the member 27 faces the sleeve. Opposite the side 29, the boss is formed with a cavity 30 exposing a portion of the outer circumference of the sleeve. In the cavity is received a loose cylindrical pin 31 lying parallel to the axis of the sleeve and engaging its outer circumference.

The upper end of each arm 13 and 14 is joined by a coil spring 32 to a suitable member 33 fixed to the housing 15. This spring tends to turn the arm and the boss in the direction that brings the thinner part of member 27 over the pin 31. In this direction the pin rides freely on the sleeve, and there is no rotation of the shaft that carries the sleeve. Movement in the opposite direction by the action of the motor 26 causes the pin to bind between the face 29 and the sleeve, whereby the latter and its shaft are turned and a corresponding movement is imparted to the associated electrode holder 3 or 4.

A means is provided for preventing drag on the sleeves under the idle movement of the clutches by the springs 32. A device for this purpose is applied to each sleeve 9 and 10, and since both are alike, only one need be described. Each such device comprises a boss 34 surrounding the corresponding sleeve but held against rotation, for which purpose it may be formed as an integral part of the housing 15, as shown in Figures 4 and 6. These devices are similar to the clutches in the sleeves 11 and 12. Each such device comprises a wedge or tapered pin 35 held in the boss by screw plugs 36. The member 35 has an inclined face 37 directed towards the sleeve within the boss. Opposite this face, the boss is recessed at 38 to expose a portion of the outer surface of the sleeve, and in the recess is loosely mounted a cylindrical pin 39. The members 35 widen in the same direction as the members 27, with reference to rotation about the common axis of the sleeves 9 and 10. Thus, if the sleeves tend to drag in the idle direction, the pins 39 will immediately bind against the members 35 and will arrest such movement. In the active direction, the pins 39 are of course freed from the surfaces 37.

Opposite each arm 13 and 14 a set screw 40 is mounted in the end wall of the housing 15 to be engaged by the arm when retracted by its spring 32. The amplitude of the arm is thereby adjusted and with it the angular movement of the sleeve on the active stroke of the one-way clutch. The play required in the links 20 when the stroke of the arm is shortened is made possible by the slot 22.

The adjusting screw 40 is the means for regulating the speed of the corresponding electrode holder while the speed of the motor 26 remains constant. The electrode holders are regulated in their speed by like devices although independently, and in like manner. This method of regulation is simpler, more direct, and more agreeable to the operator than the previous method of changing the speed of the motor and compensating the speed of one of the electrode holders. Also, the invention eliminates the erratic condition produced by the adjustment of the motor speed and a compensating device as in prior mechanisms.

Although a specific embodiment of the invention has been illustrated and described, it will be understood that various alterations in the details of construction may be made without departing from the scope of the invention as indicated by the appended claims.

What I claim is:

1. In an electrode feeding mechanism, a pair of independently rotatable screw shafts in substantial axial alinement, a pair of electrode holders propelled respectively by said shafts, a driving member, a driving unit between said member and each of the shafts, and means associated with each unit for varying the speed ratio between the corresponding shaft and said member, said means being independent of each other.

2. In an electrode feeding mechanism, a pair of independently rotatable screw shafts in substantial axial alinement, a pair of electrode holders propelled respectively by said shafts, a driving member, a one-way drive between each shaft and said member, and means independent of each other for adjusting the stroke of such one-way drive.

3. In an electrode feeding mechanism, a pair of independently rotatable screw shafts in substantial axial alinement, a pair of electrode holders propelled respectively by said shafts, a driving member, a one-way clutch operable on each shaft, an arm extending from each clutch, means operated by said member for oscillating said arms and clutches, and means independent of each other for adjusting the stroke of said arms.

4. In an electrode feeding mechanism, a pair of independently rotatable screw shafts in substantial axial alinement, a pair of electrode holders propelled respectively by said shafts, a driving member, a driving unit, a one-way clutch operable on each shaft, an arm extending from each clutch, means operated by said member for oscillating said arms and clutches, and an adjustable stop for each arm and engageable thereby in its idle movement.

5. In an electrode feeding mechanism, a pair of independently rotatable screw shafts in substantial axial alinement, a pair of electrode holders propelled respectively by said shafts, a driving member, a driving unit, a one-way clutch operable on each shaft, an arm extending from each clutch, means operated by said member for oscillating said arms and clutches, springs for moving said arms in the non-clutching direction, and means independent of each other for adjusting the stroke of said arms in their movement by said springs.

6. In an electrode feeding mechanism, a pair of independently rotatable screw shafts in substantial axial alinement, a pair of electrode holders propelled respectively by said shafts, a driving member, a driving unit, a one-way clutch operable on each shaft, an arm extending from each clutch, means operated by said member for oscillating said arms and clutches, springs for moving said arms in the non-clutching direction, and an adjustable stop for each arm and engageable thereby in its movement by its spring.

7. In an electrode feeding mechanism, a pair of independently rotatable screw shafts, one of said shafts having a portion telescoped through and extending beyond the other shaft, a pair of electrode holders propelled respectively by said shafts, a driving member, driving units operatively connecting said member to said extended shaft portion and to the other shaft, and means associated with each unit for varying the speed ratio between the corresponding shaft and said member, said means being independent of each other.

8. In an electrode feeding mechanism, a pair of independently rotatable screw shafts, one of said shafts having a portion telescoped through and extending beyond the other shaft, a pair of electrode holders propelled respectively by said shafts, a driving member, one-way drives operatively connecting said member to said extended shaft portion and to the other shaft, and means independent of each other for adjusting the stroke of each one-way drive.

9. In an electrode feeding mechanism, a pair of independently rotatable screw shafts, one of said shafts having a portion telescoped through and extending beyond the other shaft, a pair of electrode holders propelled respectively by said shafts, a driving member, a one-way clutch operable on said extended shaft portion and another one-way clutch operable on the other shaft, an arm extending from each clutch, means operated by said member for oscillating said arms and clutches, and means independent of each other for adjusting the stroke of said arms.

10. In an electrode feeding mechanism, a pair of independently rotatable screw shafts, one of said shafts having a portion telescoped through and extending beyond the other shaft, a pair of electrode holders propelled respectively by said shafts, a driving member, a one-way clutch operable on said extended shaft portion and another one-way clutch operable on the other shaft, an arm extending from each clutch, means operated by said member for oscillating said arms and clutches, and an adjustable stop for each arm and engageable thereby in its idle movement.

11. In an electrode feeding mechanism, a pair of independently rotatable screw shafts, one of said shafts having a portion telescoped through and extending beyond the other shaft, a pair of electrode holders propelled respectively by said shafts, a driving member, a one-way clutch operable on said extended shaft portion and another one-way clutch operable on the other shaft, an arm extending from each clutch, means operated by said member for oscillating said arms and clutches, springs for moving said arms in the non-clutching direction, and means independent of each other for adjusting the stroke of said arms in their movement by said springs.

12. In an electrode feeding mechanism, a pair of independently rotatable screw shafts on nonintersecting axes, a pair of electrode holders propelled respectively by said shafts, a driving member, a driving unit between said member and each of said shafts, and means associated with each unit for varying the speed ratio between the corresponding shaft and said member, said means being independent of each other.

KARL BRENKERT.